United States Patent [19]

Wiles, Jr. et al.

[11] Patent Number: 4,837,679
[45] Date of Patent: Jun. 6, 1989

[54] SYSTEM FOR SUPPORTING AN ERASE INPUT KEY WITH INPUT SUPPRESSION IN A SYSTEM FOR OPTIMIZING DATA TRANSMISSION ASSOCIATED WITH ADDRESSABLE-BUFFER DEVICES

[75] Inventors: Philip V. Wiles, Jr., Houston; Thomas A. Harper; Carol R. Harper, both of Sugarland, all of Tex.

[73] Assignee: BMC Software, Inc., Sugarland, Tex.

[21] Appl. No.: 948,150

[22] Filed: Dec. 31, 1986

[51] Int. Cl.⁴ .................... G06K 15/00; H04L 11/00
[52] U.S. Cl. .................................. 364/200; 364/514
[58] Field of Search ... 364/200 MS File, 900 MS File, 364/514

[56] References Cited

U.S. PATENT DOCUMENTS

| | | | |
|---|---|---|---|
| 4,124,888 | 11/1978 | Washburn | 364/200 |
| 4,124,889 | 11/1978 | Kaufman et al. | 364/200 |
| 4,481,574 | 11/1984 | DeFino et al. | 364/200 |
| 4,587,633 | 5/1986 | Wang et al. | 364/900 |
| 4,620,289 | 10/1978 | Chauvel | 364/521 |
| 4,750,137 | 6/1988 | Harper et al. | 364/514 |

FOREIGN PATENT DOCUMENTS

| | | |
|---|---|---|
| 0117281 | 5/1984 | European Pat. Off. |
| 59-890563 | 5/1984 | Japan |
| 60-238976 | 11/1985 | Japan |
| 60-239143 | 11/1985 | Japan |

OTHER PUBLICATIONS

"Catching the Whispers from Uranus", Aerospace America, May 1986, p. 44 (Lexis Printout, pp. 4-8).
Ovsyannikov et al., "A Method of Avoiding Duplication of Documentary Information", Soviet Instr. & Ctl. J., No. 4, Apr. 1971, pp. 6-8.
Nagel et al., IBM Tech. Discl. Bulletin, vol. 2, No. 7, Dec. 1978, "Programmable Communications Subsystem . . .".
Wallace et al., "Data Driven Operating Concepts for Real-Time Simulation Systems", IEEE 1985, Nat'l Aerospace & Electr. Conf., pp. 156-163.

Primary Examiner—Gareth D. Shaw
Assistant Examiner—Michael A. Jaffe
Attorney, Agent, or Firm—Arnold, White & Durkee

[57] ABSTRACT

ERASE INPUT support is provided for the optimizer system disclosed in commonly-assigned co-pending application Ser. No. 827,767, now U.S. Pat. No. 4,750,137, by altering the programming of the optimizer system so that the only MDT flags turned off in the optimized outgoing data stream are those associated with protected pre-modified fields. The programming is further altered so that when an incoming data stream is received by the optimizer system, all unprotected fields in the present-state image are preprocessed prior to being updated from the incoming data stream to reflect the information available to the optimizer system as to whether the ERASE INPUT key has been pressed.

2 Claims, 6 Drawing Sheets

Fig. 1

| CONTENTS | N | O | W | | I | S | N | O | T | T | I | M | E |
|---|---|---|---|---|---|---|---|---|---|---|---|---|---|
| ADDRESS | 1 | 2 | 3 | 4 | 5 | 6 | 7 | 8 | 9 | 10 | 11 | 12 | 13 |

Fig. 2

| CONTENTS | Δ | N | O | W | | ☐ | I | S | | T | H | E | T | I | M | E |
|---|---|---|---|---|---|---|---|---|---|---|---|---|---|---|---|---|
| ADDRESS | 1 | 2 | 3 | 4 | 5 | 6 | 7 | 8 | 9 | 10 | 11 | 12 | 13 | 14 | 15 | 16 | 17 |

SYSTEM FOR SUPPORTING AN ERASE INPUT KEY WITH INPUT SUPPRESSION IN A SYSTEM FOR OPTIMIZING DATA TRANSMISSION ASSOCIATED WITH ADDRESSABLE-BUFFER DEVICES

BACKGROUND OF THE INVENTION

This invention relates to an improvement in a system for optimizing data transmission associated with addressable-buffer devices, such as that disclosed in copending U.S. Patent Application Serial No. 827,767, filed Feb 7, 1986, now U.S. Pat. No. 4,750,137 and assigned to the assignee of the present application. Said co-pending application is incorporated by reference herein.

The system disclosed in the above-cited co-pending application is one for optimizing the telecommunication of formatted data streams between a host computer, on the one hand, and a device that notes the data stream content in an addressable buffer, on the other. The device may be, for example, a screen-type display terminal, a printer, or other apparatus. The host and device may be in close physical proximity, as in the case of a local terminal at the site of the host, or they may be physically remote, as in the case of a dial-up terminal used to communicate with the host.

Data Streams

In many on-line computer applications, end-users utilize terminal devices to view selected data and sometimes to enter or update the data. A travel agent in Los Angeles, for example, might use a remote terminal to send a data stream to an airline reservtion host computer in Dallas requesting a display of all flights from Houston to New York. The host computer responds with a series of data streams containing the desired information.

Addressable Buffers

A number of common terminal devices use an addressable buffer associated, e.g., with a screen display or a printer. Generally speaking, a "buffer" is an organized group of updatable electronic memory cells reserved for a particular use. A display or print buffer is typically a buffer that holds information displayed on a terminal screen or a hard-copy printout. It could be said that the screen or printer serves as a "viewer" for examining the contents of the device buffer in much the same way that a microfiche viewer can be used to examine back issues of newspapers stored on fiche.

Figure 1:
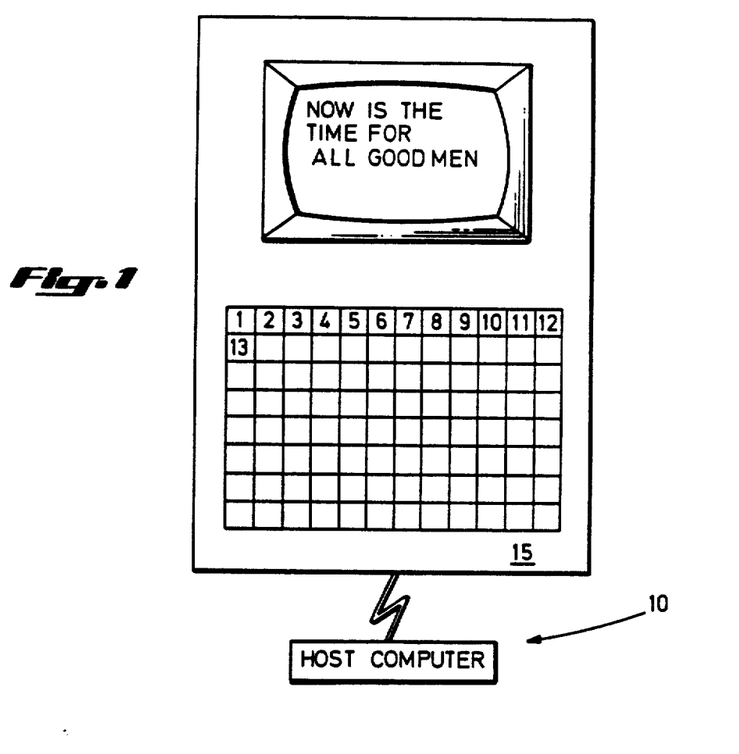
FIG. 1 is a simplified block diagram representing typical data telecommunications arrangements.

FIG. 1 shows a greatly simplified representation of a typical device buffer arrangement. The host computer sends a data stream to the terminal device over a telecommunications line. The device, preprogrammed with its own internal software of a kind well known to those skilled in the art, updates the contents of the display buffer in response to data streams generated either by the host computer or by the terminal user (e.g., through a keyboard). The display shows the updated contents of the device buffer.

Data Stream Protocols

The effectiveness of a communication system such as that represented in FIG. 1 is commonly enhanced by programming the host computer and the terminal device to handle data streams in accordance with a pre-specified convention. Such a convention is known as a "protocol." Protocols typically include specifications for treating some portions of a data stream as data and other portions as embedded commands.

Figure 2:
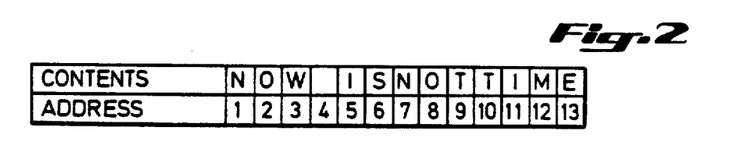
FIGS. 2 and 3 are representations of maps of the contents of a display buffer.

In the example represented in FIGS. 1 and 2, an outgoing data stream from the host computer might include a command for the terminal device to prepare to write new data into the display buffer beginning at buffer address 7. The outgoing data associated with this command might then consist of the characters "n o t". The terminal would process this command and modify the device buffer in accordance with the associated data. The display, which acts as a window on the buffer, would then read "Now is not time .. ." instead of "Now is the time . . . ."

Field Attribute Bytes

Figure 3:
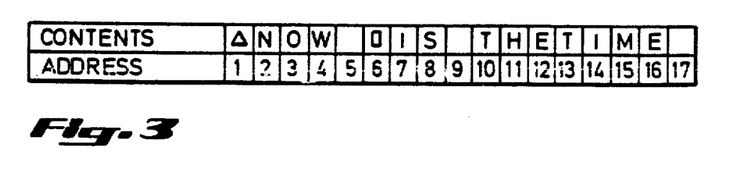
Figure 4:
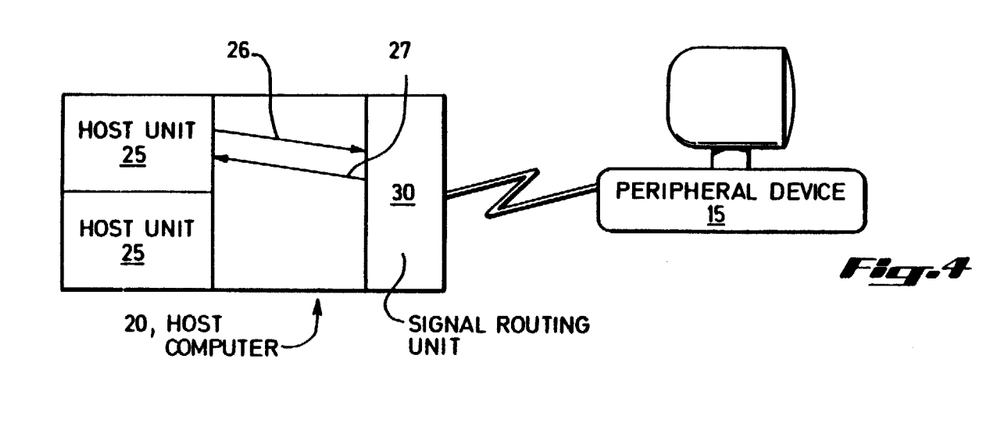
FIG. 4 is a simplified block diagram of a typical host application program as used in a telecommunication system.
Figure 5:
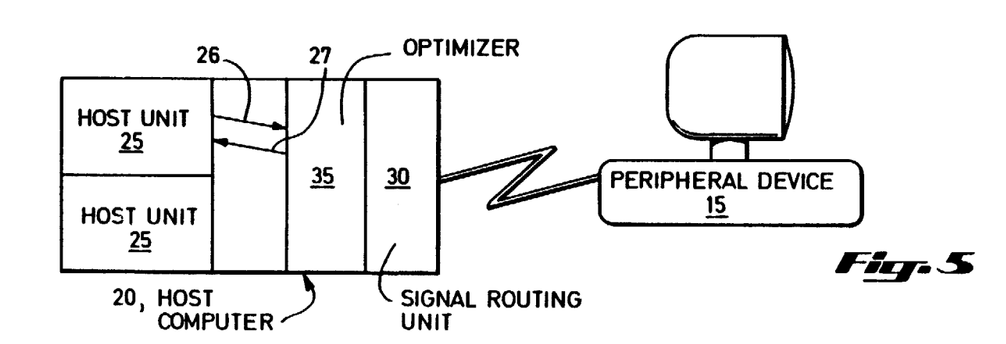
FIG. 5 is a simplified block diagram of the same system with an optimizer in accordance with the invention of the co-pending application interposed between the application program and the host communications device.
Figure 6A:
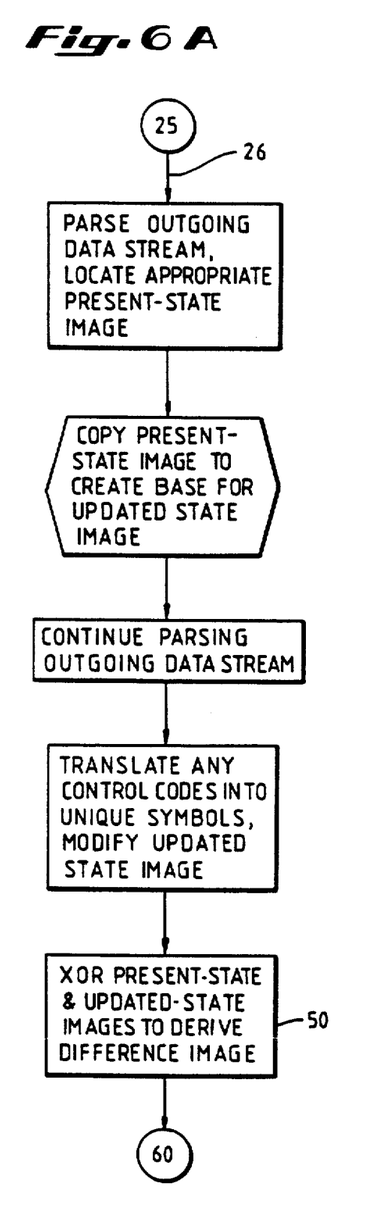
FIGS. 6A and 6C are flow charts of the operation of the optimizer of the co-pending application in processing an outgoing data stream.
Figure 6B:
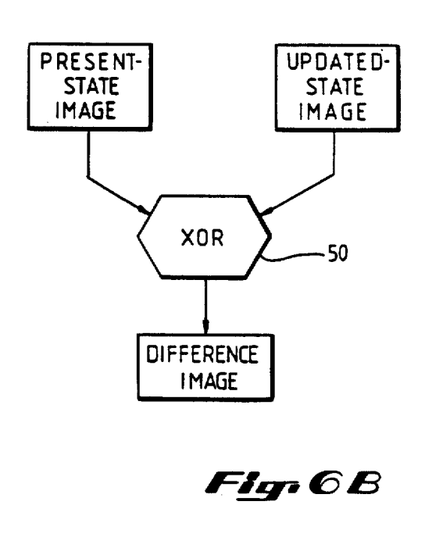
FIG. 6B is a block diagram of one of the operations represented in FIG. 6A.
Figure 6C:
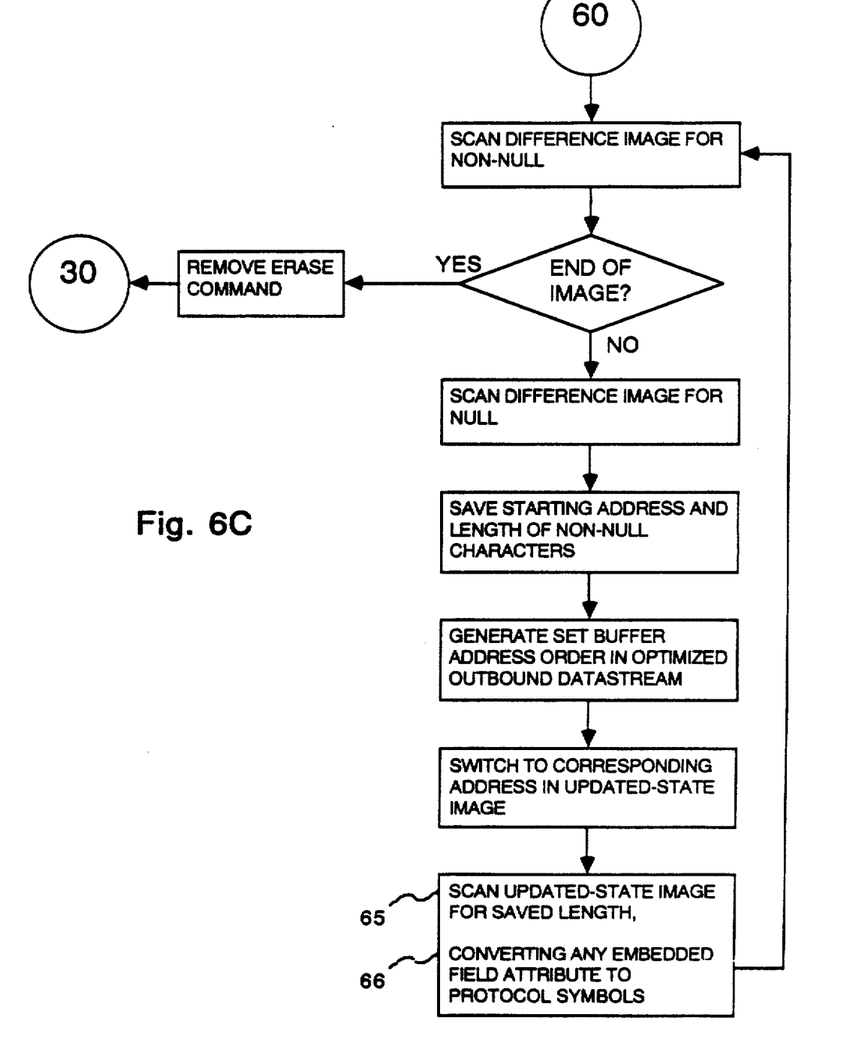

Some communications systems embed codes within the buffer itself that indicate to the terminal's internal software just how subsequent characters in the buffer should be presented on the display screen or printout. The IBM 3270 system is an example of such a system. In the simplified example shown in FIG. 3, the character at buffer address 1 is assumed to be a code that causes a terminal screen to display all subsequent characters (i.e., the characters stored at buffer addresses 2, 3, and so forth) extra bright on the screen. The code itself is displayed as a blank on the screen. All subsequent "real" characters are displayed extra bright until the brightness is turned off by another embedded code. In FIG. 3, a code representing "normal" display is shown at buffer address 6. The terminal causes subsequent "real" characters in the buffer (e.g., at addresses 7, 8, and so on) to be displayed on the screen at normal intensity.

In such a system, the data characters that occupy the elements of a device buffer between any two such control codes are commonly referred to as a field. The control code that occupies the buffer address immediately prior to the first character in a field is known as the field attribute character, or field attribute byte, for that field. In the simplified example of FIG. 3, the field attribute byte for the field containing the characters "N o w" is located at buffer address 1.

Techniques for controlling the field attribute byte are well known. Those skilled in the art will recognize that the IBM 3270 system, for example, utilizes known bit masking and shifting techniques to encode a number of different field attributes (brightness, etc.) into a single field attribute byte. One field attribute byte can thus control several attributes for any given field.

Modified Data Tag (MDT) Attribute

One of the field attributes provided for in some telecommunications systems, for example the IBM 3270 system, is known as a "modified data tag" (MDT) attribute. The MDT attribute works in conjunction with the terminal device's internal software or other control system: if the terminal notes that the MDT attribute flag for a given field is set, it includes the contents of the field in the next inbound data stream.

A host application can pre-set the MDT flag for a given field to ensure that the associated field data is transmitted inbound, whether or not it has been modified. Such a field is known as a "pre-modified" field. This technique may be useful, e.g., in a data base system where a host computer serves a number of devices, each of which is examining a particular record in a data base, by forcing each device to transmit certain portions of its buffer, e.g., the identifying number of the data base record.

System of Co-Pending Application

The optimizer system disclosed in the above-cited copending application is briefly summarized herein for convenience. A more detailed description thereof is contained in the co-pending application itself, which as noted above is incorporated herein by reference.

The optimizer system of the co-pending application is transparently interposed between a host computer application program and a telecommunications link connecting the host computer with an addressable-buffer terminal device such as a screen-display terminal, a printer, or other apparatus. The optimizer includes a computer program that remains resident in the host computer's memory. The program causes the computer (a) to divert outgoing data streams that would normally be transmitted to the device by the host; (b) to generate new optimized outgoing data streams conforming to the communications protocol in use; and (c) to hand back each optimized data stream back for further outgoing transmission in place of the corresponding original data stream.

Each incoming data stream reflects only the contents of the fields in the device buffer that have actually been modified. If the host has previously instructed the device to transmit all fields, however, whether or not modified, the host might attempt to retransmit the instruction or even take improper action. To prevent this, the optimizer creates a new incoming data stream, which conforms to the host's previously-noted expectations about the incoming data stream, and hands it back to the host in lieu of the data stream actually received.

The contents of an optimized outgoing data stream reflect the result of a comparison by the optimizer of (1) an image in random-access memory (RAM) of the "updated state" of the device buffer, namely the state assumed by the host application to exist in the device buffer after reception by the device of the original outgoing data stream; with (2) a similar RAM image of the assumed present state of the device buffer. The comparison is achieved by performing an exclusive-or (XOR) operation to generate a RAM image that indicates which characters in the updatedstate image reflect changes from the present-state image. In some systems, this XOR operation can be achieved by destructively superimposing the updated-state RAM image over the (no longer needed) present-state RAM image, thus eliminating the need for additional RAM for a third image.

The optimized data stream "handed back" by the optimizer thus represents the differences between the assumed present and updated states of the device buffer. Consequently, it is normally shorter than the usual displayrefreshing data stream which represents the entire updated state of the buffer, and it thus requires correspondingly less transmission time.

Modified Fields and ERASE INPUT Key Operation

When a buffer field in a remote device is changed by the operator, typically the remote device's internal programming causes the MDT attribute flag for that field to be set to the "on" state so that the field will be transmitted as part of the next inbound data stream. One particular type of change to a field, however, namely the ERASE INPUT key supported in some systems, does not cause the MDT flag to be set "on." Instead it causes the MDT flag for all unprotected fields to be turned off. Even the MDT flags for pre-modified unprotected fields (i.e., MDT flags preset by the host application) are turned off by the ERASE INPUT key. Protected fields are unaffected. The term "unprotected" and "protected" refers to the state of a field attribute which respectively allows or does not allow changes to be made to the contents of the field.

In such systems, the ERASE INPUT key has two effects when pressed, caused by the internal programming which controls the remote device: (a) it "zeroes out" all fields in the device buffer whose attribute bytes do not indicate a "protected" state, i.e., it replaces the contents of each buffer memory location for those fields with nulls; and (b) it sets the MDT flag for those unprotected fields to the "off" state so that the zeroed-out fields will not be transmitted back to the host.

An example of a use of the ERASE INPUT key might be as follows. An operator of a remote device might wish to change the street address shown in a host-application database for a particular customer, but not that customer's city, state, or ZIP Code. Assume that all of these items are in unprotected fields. Once the existing information about the customer is displayed on the screen of the device, the ERASE INPUT key would zero out all unprotected fields to ease the keyboarding burden of erasing, then retyping, the data fields in question. Only the field in which the operator actually typed in new data, i.e., the street address, thereby turning "on" the MDT flag for that field, would be transmitted inbound to the host. The city, state, and ZIP Code would not be transmitted, even though the contents of those fields in the remote device buffer had been "altered" by being zeroed out.

Inbound Optimization and the ERASE INPUT Key

Inaccuracies can result when inbound optimization is used in a host-device system which supports an ERASE INPUT key of the kind just described. The inbound optimization referred to is of the type described in detail in the above-cited co-pending application. The inaccuracies arise from the fact that the optimizer's processing of an incoming data stream includes augmentation of the data stream with the contents of any pre-modified fields. In an unoptimized system, those contents would normally be transmitted inbound by the remote device, and which the host application therefore expects to be included in the incoming data stream.

When the ERASE INPUT key is pressed, however, not even pre-modified fields would be expected to be transmitted even in an unoptimized system (unless those fields were subsequently actually changed as described above). Under these circumstances, the augmented data stream created by the optimizer, which would include the contents of any pre-modified fields, would thus contain too much data and would not accurately represent the data stream that would have been transmitted inbound in an unoptimized system. Depending on the programming of the host application, this lack of "transparency" of the optimizer to the host application could result in errors or "bugs."

SUMMARY OF THE INVENTION

In accordance with the present invention, an improved optimizer system is disclosed. The programming of the optimizer system of the above-cited copending application is altered so that the only MDT flags turned off in the optimized outgoing data stream are those associated with protected pre-modified fields.

The programming is further altered so that when an incoming data stream is received by the optimizer, all unprotected fields in the present-state image are preprocessed prior to being updated from the incoming data stream to reflect the information available at the optimizer as to whether the ERASE INPUT key has been pressed.

If no unprotected fields were pre-modified in the original outgoing data stream created by the host application, or if all pre-modified fields in the original outgoing data stream are represented in the incoming data stream, then during such preprocessing the data portions of all unprotected fields in the present-state image are filled with the in-doubt character. This reflects the lack of information at the optimizer as to whether the ERASE INPUT key has been pressed, since it is possible that the key was pressed, and then all pre-modified fields were actually changed, thus turning the MDT flags back on. In such an event, non-premodified, unchanged fields would have been zeroed out at the remote device buffer, but would erroneously be represented in the present-state image as containing data.

On the other hand, if some unprotected fields were pre-modified, but less than all of them are included in the incoming data stream, it follows that all unprotected fields in the remote device buffer had at some point been zeroed out, and their MDT flags turned off, by an ERASE INPUT keystroke. All unprotected fields in the presentstate image are consequently filled with nulls during preprocessing to reflect this.

After either form of preprocessing, the present-state image is then used to construct a simulated, unoptimized incoming signal to be handed back to the host application, as described in detail in the co-pending application.

BRIEF DESCRIPTION OF THE DRAWINGS

In the drawings, FIGS. 1 through 7, described in more detail below, are reproduced from the drawings in the above-cited co-pending application for purposes of background information.

Throughout the following detailed description, similar reference numerals refer to similar elements in all Figures of the drawings.

DETAILED DESCRIPTION OF SPECIFIC EMBODIMENTS

In accordance with the present invention, the programming of the optimizer disclosed in the co-pending application is modified to support the use of an ERASE INPUT key. As pointed out in the co-pending application, the actual programming details may vary considerably depending on the kind of computer system used, the operating system, and so forth.

Figure 8:
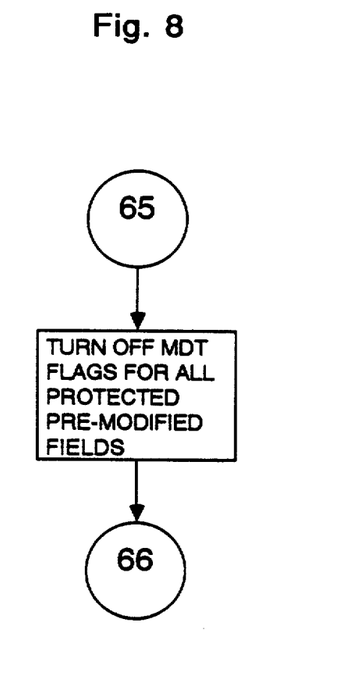
FIG. 8 is a flow chart illustrating the processing of an outgoing data stream; the method steps shown in FIG. 8 in connection with the present invention correspond to those of the co-pending application shown in FIG. 6C.

As shown in FIG. 8, protected fields in the outgoing optimized data stream are handled in a different manner than unprotected fields. Pre-set MDT flags are turned off prior to an outgoing transmission only for protected fields; such flags in unprotected fields are left alone. It will be noted that use of the ERASE INPUT key in a host-device system such as described above does not affect the MDT flags of protected fields, and so the optimization taught in the co-pending application need not be modified with respect to those fields.

Three possibilities exist with respect to unprotected pre-modified fields when an incoming data stream returns after such an outgoing transmission. First, in a special case, it may have been that no unprotected fields were pre-modified to begin with. Second, all pre-modified unprotected fields may indeed be included in the incoming data stream, i.e., the MDT flags for all such fields are turned on. Finally, less than all such fields may be included, i.e., some of the MDT flags for such fields are turned off.

In any of these three cases—i.e., any time ERASE INPUT key support is enabled in the optimizer—incoming data streams are preprocessed before being parsed as described in the co-pending application. Preprocessing in the first and second cases above, in which information is not readily available as to whether the ERASE INPUT key was actually pressed, are handled in a similar manner to each other. Preprocessing of the third case, in which the ERASE INPUT key is in fact known to have been pressed, is handled in a slightly different manner.

In the first and second cases above, the manner of handling of the incoming data stream is indicated by the absence of reliable information about the actual state of the remote-device buffer. This lack of information could adversely affect the next outgoing data stream. For example, the optimizer would ordinarily assume that any fields missing from the incoming data stream had their MDT flags turned off, meaning they had not been modified at the remote device since the previous outgoing transmission. On the next outgoing transmission, the optimizer might not include data for those fields in the optimized outgoing data stream (e.g., if the host application itself did not make changes), because of its assumption that those fields were unchanged at the remote device from the previous outgoing transmission. If the ERASE INPUT key had been pressed, however, those fields would indeed have been changed, by being zeroed out. The next outgoing data stream would thus include too little data; the zeroed-out fields at the remote buffer would incorrectly remain zeroed out.

Consequently, during preprocessing of incoming data streams in the first and second cases above, all unprotected fields in the present-state image are filled with the in-doubt character described in the co-pending application. This causes the present-state image to reflect the uncertainty about the contents of those fields.

Figure 9:
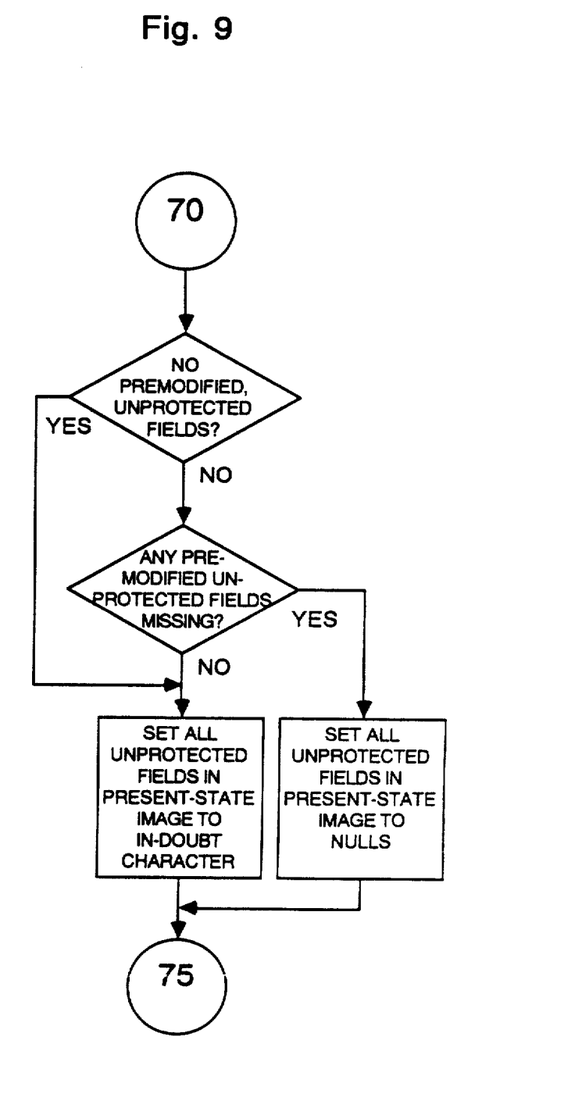
FIG. 9 shows preprocessing steps performed in connection with the processing of an incoming data stream.

In the third case above, incoming preprocessing is modified slightly. When not all pre-modified fields are included in the incoming data stream, it follows that the missing pre-modified fields must have had their MDT flags turned off. This in turn implies that the ERASE INPUT key must have been pressed, and that all unprotected fields must therefore have been "zeroed out" with respect to their contents at the remote device. Consequently, as shown in FIG. 9, all unprotected fields in the present-state image maintained by the optimizer are set to nulls.

Figure 7:
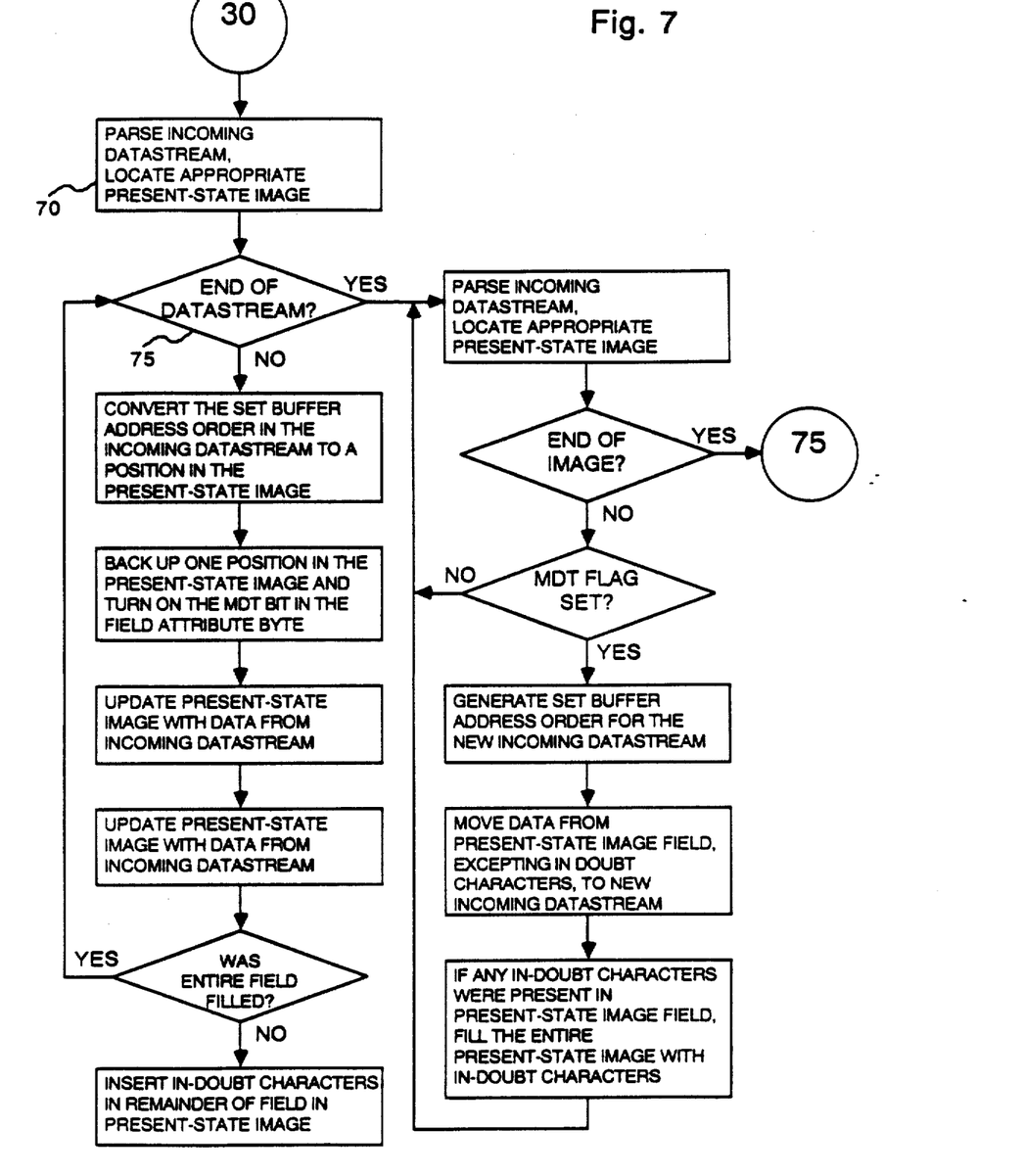
FIG. 7 is a flow chart of the operation of the optimizer of the co-pending application in processing an incoming data stream. The reference numerals 70 and 75 have been added to the figure for ease of reference.

After preprocessing in any of the three cases above, any actual changes in fields represented in the incoming data stream are then incorporated into the present-state image as described in the co-pending application. Any remaining nulls or in-doubt characters are omitted from the simulated unoptimized incoming signal as shown in FIG. 7.

The above-described optimizer support for ERASE INPUT key operation is preferably selectable by the user. Some remote devices may not have such an ERASE INPUT key, for example, in which case it would be preferable to deactivate optimizer support. This would result in all pre-set MDT flags in pre-modified fields being turned off, for maximum incoming optimization, as described in the above-cited copending application.

It will be appreciated by those skilled in the art having the benefit of this disclosure that this invention is believed to be capable of application in other situations. Accordingly, this description is to be construed as illustrative only and as for the purpose of teaching those skilled in the art the manner of carrying out the invention. As noted above, considerable variation can be expected in the actual manner of efficient implementation of the invention with respect to any particular computer system, operating system, etc. It is intended that the following claims be interpreted to embrace all such variations.

What is claimed is:

1. A method for optimizing a signal exchange,
    said signal exchange including one or more outgoing transmissions of outgoing signals having information contents and generated by a host unit to be received for processing by a peripheral unit,
    said signal exchange further including one or more incoming transmissions of incoming signals having information contents and generated by the peripheral unit to be received for processing by the host unit,
    said peripheral device having an addressable peripheral unit buffer modifiable at the peripheral unit in response to the information contents of an outgoing signal,
    the peripheral unit buffer having information contents that are logically dividable into one or more fields,
    each said field having a field attribute byte for representation of field attributes,
    one said field attribute being a modified data tag (MDT) signifying a premodified field and capable of selectively having a set state or an unset state,
    another field attribute being a protected-field attribute representing a protected field,
    said method comprising the steps, executed by a machine, of:

creating a buffer contents map in a storage device, said buffer contents map representing information available at the machine about the informational contents of said peripheral unit buffer;
    for each outgoing signal that would cause a modification of the informational contents of the peripheral unit buffer,
    blocking the outgoing signal from being processed by the peripheral unit,
    updating said buffer contents map to reflect the informational content of said outgoing signal, and
    generating and transmitting to the peripheral unit an input-suppressed signal,
    any MDT for any protected field in the outgoing signal being in said unset state in said inputsuppressed signal;
    for each incoming signal subsequent to a previous said outgoing signal,
    blocking the incoming signal from being processed by the host unit,
    updating said buffer contents map to reflect the informational content of said incoming signal,
    if no fields in the outgoing signal were premodified fields, filling all unprotected fields in the buffer contents map with an in-doubt character,
    if the incoming signal includes fields corresponding to all premodified fields in the outgoing signal, filling all unprotected fields in the buffer contents map with an in-doubt character,
    otherwise, if the incoming signal includes fields corresponding to less than all premodified fields in the outgoing signal, filling all unprotected fields in the buffer contents map with nulls, and
    generating and transmitting an augmented incoming signal to the host unit,
    said augmented incoming signal including the informational content of the buffer contents map corresponding to the fields in the peripheral unit buffer, if any, associated with any premodified fields in the previous outgoing signal.

2. A method for optimizing an exchange of one or more signals,
    said exchange including one or more transmissions of outgoing signals generated by a host unit to be received for processing by a peripheral unit,
    said exchange further including one or more transmissions of incoming signals generated by the peripheral unit to be received for processing by the host unit,
    each said signal having encoded within it, one after another, one or more members of a set of protocol symbols defined by a protocol for use in representing data,
    each said signal being organized in accordance with rules defined by said protocol for classification of protocol symbols into a first class of meaning or one or more other classes of meaning,
    said classification of a given protocol symbol being affected (a) by whether said
    given protocol symbol is a member of a group of zero or more special protocol symbols, and (b) if not, by a positional relationship within the signal, if any, between said given protocol symbol and zero or more of such special protocol symbols;
    said peripheral unit having an addressable peripheral unit buffer modifiable at the peripheral unit in response to addressing commands encoded into an outgoing signal and having information contents that are logically dividable into one or more fields, each said field having a field attribute byte for representation of field attributes, one said field attribute being a modified data tag (MDT) signifying a premodified field and capable of selectively having a set state or an unset state, another field attribute being a protected-field attribute representing a protected field, said peripheral unit buffer having existing information contents corresponding to one or more buffer-contents symbols that are members of said set of protocol symbols, said existing information contents of the peripheral unit buffer being represented in a present-state map stored in a storage device, each buffer-contents symbol within said first class of meaning being represented within said presentstate map by one or more translated symbols which are not members of said set of protocol symbols, said method comprising the steps, executed by a machine, of:

for each outgoing signal that would cause the peripheral unit to modify the information contents of the peripheral unit buffer resulting in new information contents for the peripheral unit buffer, blocking the outgoing signal from being processed by the peripheral device, generating an updated-state map in a storage device, utilizing the present-state map and the outgoing signal as inputs, said updated-state map representing said new information contents of the peripheral unit buffer, each buffer-contents symbol within said first class of meaning being represented within said updated-state map by one or more translated symbols which are not members of said set of protocol symbols;

generating and transmitting to the peripheral unit an input-suppressed signal, each symbol in said input-suppressed signal that is classified within said first class of meaning being encoded as one or more symbols which are members of said set of protocol symbols, said input-suppressed signal including an MDT in said unset state for any protected field in the outgoing signal;

for each incoming signal subsequent to a previous outgoing signal, blocking the incoming signal from being processed by the host unit, utilizing the present-state map and the informational content of said incoming signal to generate a new present-state map representing the new information contents of the peripheral unit buffer, if no fields in said previous outgoing signal were premodified fields, all unprotected fields in the new present-state map being filled with an in-doubt character, else if the incoming signal includes fields corresponding to all the premodified fields in the outgoing signal, all unprotected fields in the new present-state map being filled with an in-doubt character, else if the incoming signal includes fields corresponding to less than all premodified fields in the outgoing signal, all unprotected fields in the new present-state map being filled with nulls, generating and transmitting an augmented incoming signal to the host unit, each symbol in said augmenting incoming signal that is classified within said first class of meaning being encoded as one or more symbols which are members of said set of protocol symbols, said augmented incoming signal including the informational content of the new present-state map corresponding to any premodified fields in the previous outgoing signal.

* * * * *

UNITED STATES PATENT AND TRADEMARK OFFICE
CERTIFICATE OF CORRECTION

PATENT NO. : 4,837,679

DATED : June 6, 1989

INVENTOR(S) : Philip V. Wiles; Jr., Thomas A. Harper; Carol A. Harper

It is certified that error appears in the above-identified patent and that said Letters Patent is hereby corrected as shown below:

Column 1, line 13, delete "1986,now" and insert --1986, now--.

Column 5, line 30, delete "presentstate" and insert --present-state--

Column 8, line 15-16, delete "inputsup-pressed" and insert --input-suppressed--.

Column 8, line 57, delete "pro ocol" and insert -- protocol--.

Signed and Sealed this

Twelfth Day of June, 1990

Attest:

HARRY F. MANBECK, JR.

*Attesting Officer*   *Commissioner of Patents and Trademarks*